United States Patent [19]
Minich et al.

[11] Patent Number: 5,400,095
[45] Date of Patent: Mar. 21, 1995

[54] DISPLAY PROJECTION METHOD AND APPARATUS AN OPTICAL INPUT DEVICE THEREFOR

[75] Inventors: Arthur P. Minich; Lane T. Hauck, both of San Diego; David W. Kappel, Oceanside, all of Calif.

[73] Assignee: Proxima Corporation, San Diego, Calif.

[21] Appl. No.: 122,697

[22] Filed: Sep. 17, 1993

Related U.S. Application Data

[63] Continuation-in-part of Ser. No. 59,550, May 11, 1993, Pat. No. 5,321,450.

[51] Int. Cl.6 .............................................. G03B 21/28
[52] U.S. Cl. ...................................... 353/119; 353/98; 353/122
[58] Field of Search .................. 353/119, 122, 29, 42, 353/21, 98; 340/706, 707

[56] References Cited

U.S. PATENT DOCUMENTS

| | | | |
|---|---|---|---|
| 4,808,980 | 2/1989 | Drumm | 353/42 |
| 4,953,971 | 9/1990 | Highfill | 353/42 |
| 5,090,800 | 4/1992 | Ushiro | 353/77 |
| 5,114,224 | 5/1992 | Miyamoto et al. | 353/122 |
| 5,235,363 | 8/1993 | Vogeley et al. | 353/42 |

*Primary Examiner*—William A. Cuchlinski, Jr.
*Assistant Examiner*—William C. Dowling
*Attorney, Agent, or Firm*—Bernard L. Kleinke; Jerry R. Potts

[57] ABSTRACT

The present invention relates to a compact display projector and method of using it to project images under the control of image generating equipment, such as computers and television systems. An optical input device is built into the projector to enable optical control signals directed onto the projected image, to be discriminated for causing the image generating equipment to modify the projected image. A positionally adjusted mirror device is disposed in optical alignment with the optical input device to reflect the optical control signals back thereto, whereby the optical input device is readily aligned with the projected image to monitor it for the occurrence of any optical control signals.

24 Claims, 2 Drawing Sheets

DISPLAY PROJECTION METHOD AND APPARATUS AN OPTICAL INPUT DEVICE THEREFOR

CROSS-REFERENCE TO RELATED APPLICATIONS

This application is a continuation-in-part patent application of U.S. patent application Ser. No. 08/059,550, filed May 11, 1993 and now U.S. Pat. No. 5,321,450 and entitled "A LOW PROFILE LIQUID CRYSTAL PROJECTOR AND METHOD OF USING SAME," which is incorporated herein by reference and which is assigned to the same assignee.

TECHNICAL FIELD

The present invention relates in general to a compact display projection method and apparatus, as well as an optical input device, for projecting an image in response to image generating equipment, such as a computer, or a live or recorded television system, such as a video cassette recorder. The invention more particularly relates to such a method and apparatus, which can be utilized to receive optical control information to cause the image generating system to modify the projected image.

BACKGROUND ART

There have been many different types of optical input devices for entering information into a computer by user manipulations of an input device, without the use of a keyboard. Such devices include absolute positioning devices such as light pens and digitized tablets, as well as relative positioning devices such as joysticks, track balls and mouse devices.

Such devices have typically been employed with cathode ray tube video monitors to enable a user to perceive visually the results of the manipulations relative to the information entered into the computer.

While such input devices have been satisfactory for single user applications, such devices did not enable a user to interact easily with a computer while making group audience presentations. More particularly, with the development of liquid crystal display technology, broader applications evolved. In this regard, by using a conventional overhead projector, computer generated information displayed on a liquid crystal display panel was able to be projected as an enlarged image onto a remote viewing surface or screen for group audience presentations.

With the advent of group presentations of computer generated images, it became highly desirable for a user or presenter of such information to interact with the computer without being confined at or near the computer controlling the projected image. In U.S. patent application Ser. No. 07/901,253 filed Jun. 19, 1992 entitled "COMPUTER INPUT SYSTEM AND METHOD OF USING SAME," there is described an optical input device, which enables a user to interact with a computer, while making a group audience presentation, without the need of being positioned at or near the computer. The optical input device enables the projected image to be modified or highlighted, as well as other control functions, such as double click, drag, and other mouse control functions. All of these control functions and others have been conveniently achieved by enabling the presenter to direct a high intensity light onto the surface of the projected image, whereby the manually directed beam of light is discriminated from the projected image and is interpreted to, in turn, provide control information directly to the computer generating the image to be projected.

While the above mentioned optical input device enables a user to interact easily with a computer during group audience presentations, the use of the large bulky overhead projector made it difficult, in some applications, for the user to transport the interactive system in a fast and convenient manner.

A compact projector including a built-in liquid crystal display panel, is disclosed in the U.S. patent application Ser. No. 08/059,550 now U.S. Pat. No. 5,321,450. The projector is compact in size, and easy to use. While such a compact projector is convenient to use, it would be highly desirable to have a built-in optical input device, which can be readily aligned with the projected image, for controlling it by enabling a presenter to direct a beam of light onto the projected image.

DISCLOSURE OF INVENTION

Therefore, it is the principal object of the present invention to provide a new and improved display projection apparatus and method, which is compact in size, and easy to use.

Another object of the present invention is to provide a new and improved optical input device, which can be readily aligned with a projected image.

The present invention relates to a compact display projector and method of using it to project images under the control of image generating equipment, such as computers and television systems. An optical input device is built into the projector to enable optical control signals directed onto the projected image, to be discriminated for causing the image generating equipment to modify the projected image. A positionally adjusted mirror device is disposed in optical alignment with the optical input device to reflect the optical control signals back thereto, whereby the optical input device is readily aligned with the projected image to monitor it for the occurrence of any optical control signals.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
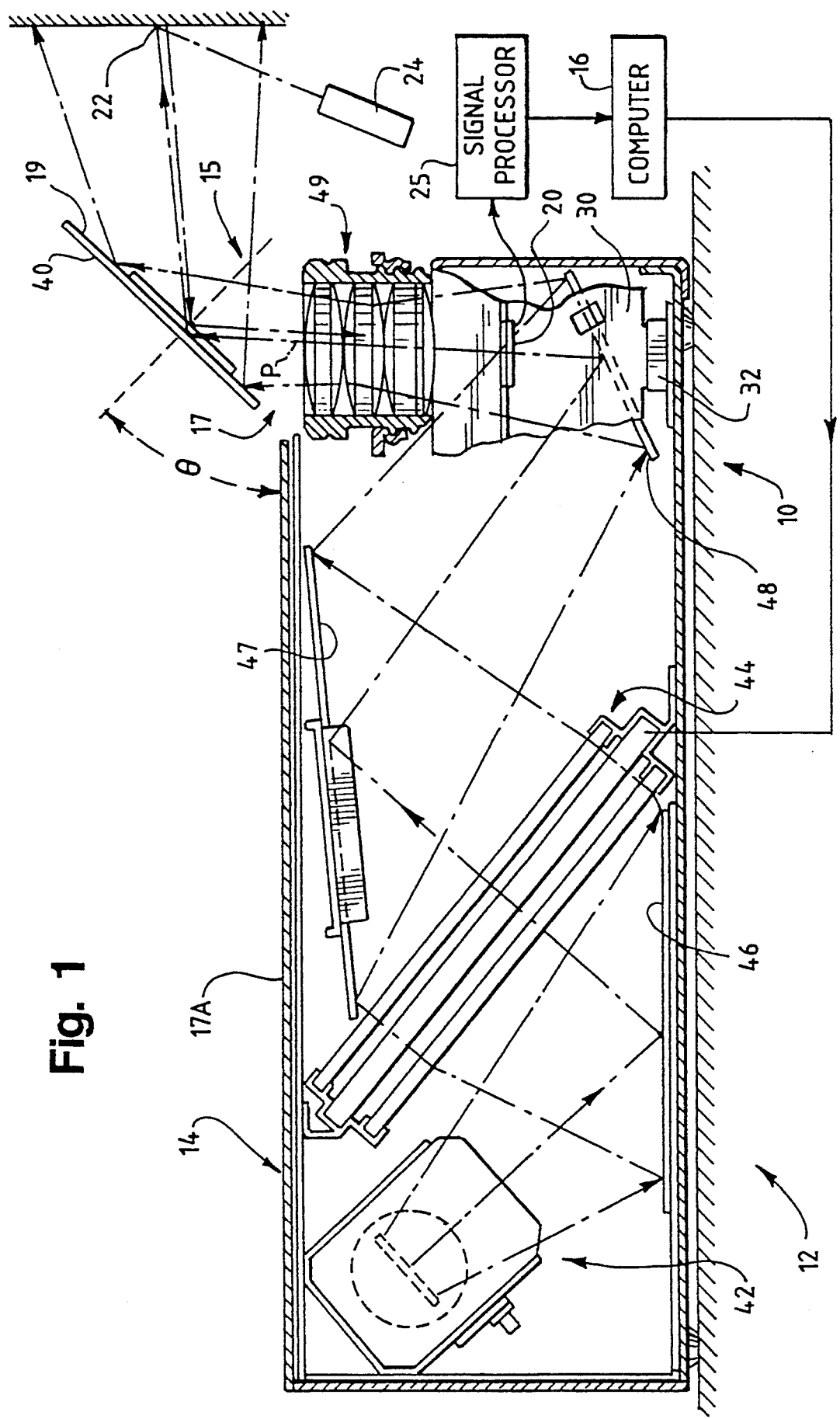
FIG. 1 is a partially diagrammatic side elevational, sectional cut away view of a compact liquid crystal projector including a built-in optical input device, which projector and device are constructed in accordance with the present invention.
Figure 2:
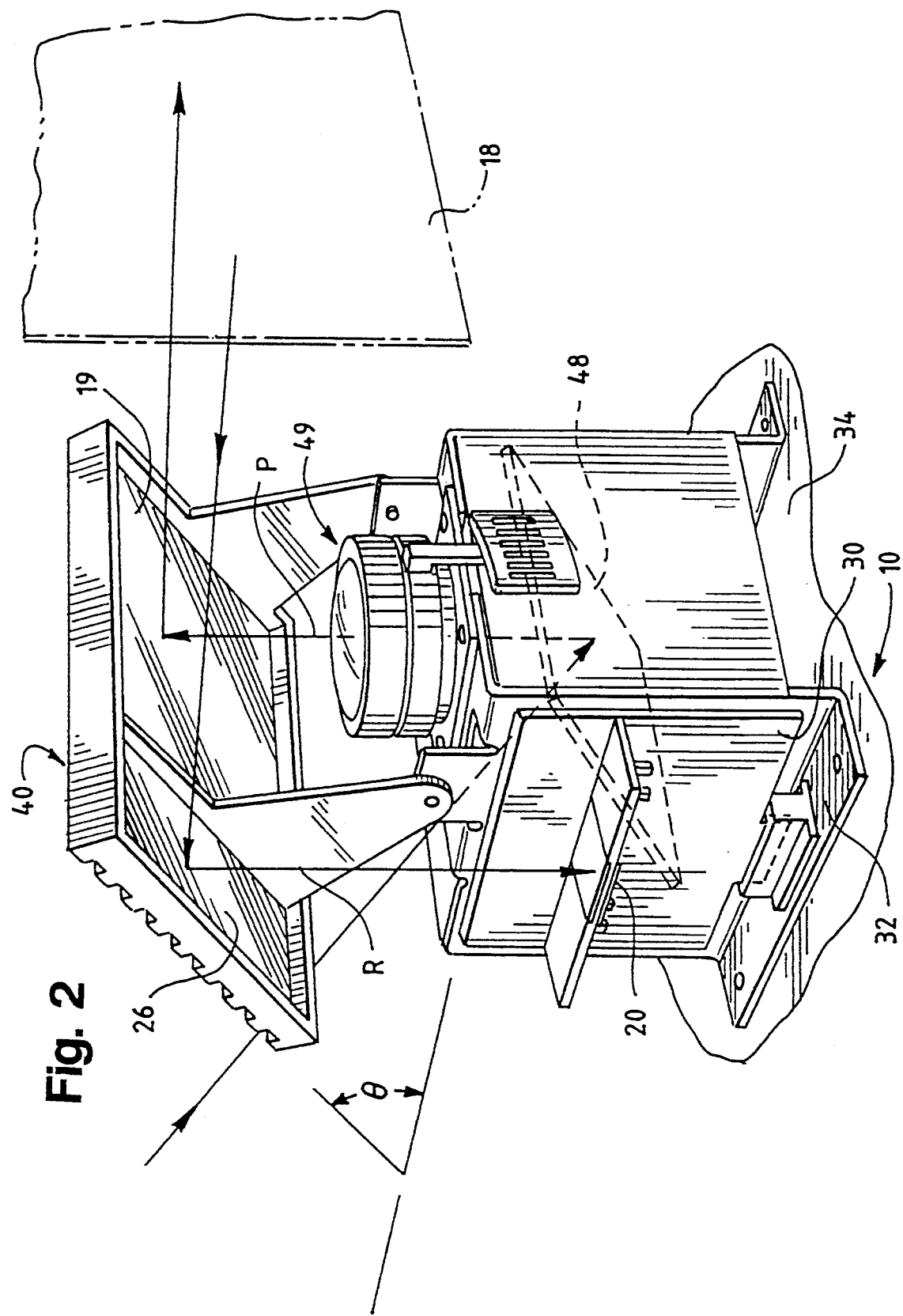
FIG. 2 is an enlarged pictorial view of the optical input device and the projector projection lens assembly of the liquid crystal projector of FIG. 1, showing the optical paths for illustration purposes.

Referring now to the drawings, and more particularly to FIGS. 1 and 2 thereof, there is shown a compact liquid crystal projector 12 having a low profile housing 14, which is constructed in accordance with the present invention and which has a built-in optical input device 10 constructed according to the invention.

The liquid crystal projector 12 includes a light source 42, a liquid crystal panel assembly 44, a set of light and image directing mirrors 46, 47 and 48, and a projection lens assembly indicated generally at 49. The compact liquid crystal projector 12 is more fully described in the copending U.S. patent application Serial No. 08/059,550.

In accordance with the method of the present invention, the optical input device 10 can be aligned conveniently to capture a reflected image of an optical control signal appearing on a projected image from the projection lens assembly 49, displayed on a remote viewing surface 18.

In this regard, an adjustable mirror assembly 40 is disposed exteriorly of a window 17 in an upper wall 17A to reflect an upwardly directed image from the projection lens assembly forwardly onto the surface 18. The mirror assembly 40 also reflects an image of a control signal appearing on the projected image downwardly through the window 17 and to the optical device 10. In this manner, according to the present invention, the mirror assembly can be adjusted positionally to direct the projected image onto the desired portion of the screen, and at the same time, the optical input device 10 is also properly aligned with the image onto the surface 18.

Once an optical control signal, in the form of a spot of high intensity light, is directed onto the projected image, the device 10 is aligned properly relative to the surface 18 to visualize the spot to discriminate it from the projected image. In this manner, due to the mirror assembly, the optical input device 10 built into the projector 12 is always in the proper position to visualize the control signal, without the need for alignment by the user.

The optical input device 10 generally includes the adjustable mirror assembly 40 for facilitating redirecting or capturing the image reflecting from the remote viewing surface 18 and an image receiving device, such as a charge coupled device or camera 20, having a wide viewing lens for viewing an auxiliary light image reflecting from any location bound by the projected image reflecting from the remote viewing surface 18. In this regard, the auxiliary light image 22 is generated by an optical input device, such as a laser light device 24 (FIG. 1), for causing the projected image 16 to be modified or changed in accordance with an absolute positioning algorithm device (not shown), such as described in copending U.S. patent application Ser. No. 07/656,803, filed Feb. 14, 1991, entitled "Method and Apparatus for Calibrating Geometrically an Optical Computer Input System." A reception mirror 26 mounted to the adjustable mirror assembly 40 enables the charge couple device or camera 20 to capture the auxiliary light image 22. In this regard, the projection mirror 19 and the reception mirror 26 are mounted relative to one another in such a matter so that light traveling along a vertical optical path P (FIG. 2) followed by the projected image within the liquid crystal projector 12 is reflected from the remote viewing surface 18 back towards the mirror 26 to enable it to capture automatically the projected image 16 reflecting from the remote viewing surface 18.

In use, in order to align the charge couple device 20 in proper alignment to capture or receive the auxiliary light image 22, a user (not shown) positions the liquid crystal projector 12 on a stationary surface, such as a table 13 and raises the projection mirror 19 and the reception mirror 26 simultaneously above the housing 14 at about an angle $\theta$ to angularly displace the mirror 19 and the mirror 26 from the horizontal plane of the housing 12. The liquid crystal projector 12 is then coupled to a video image producing device, such as a personal computer (not shown) to cause a computer generated video image to be thrown by the projector 12 via the mirror 19 onto the remote viewing surface 18. The projected image reflecting from the remote viewing surface 18, in turn, is captured by the reception mirror 26. In this regard, the reception mirror 26 causes the reflected image to be directed downwardly into the projector housing 14 along a vertical optical path R adjacent to the vertical optical path P followed by the projected image and into the wide viewing lens of the charged coupled device 20. Thus, the charge coupled device 20 is aligned automatically to capture or receive the entire field of the image reflecting from the remote viewing surface 18. In this manner, whenever the user causes an auxiliary light image, such as the auxiliary light image produced by the light device 24, to be displayed on the remote viewing surface 18 within the area defined by the thrown image, the absolute positioning algorithm device converts the charged coupled device coordinate location values of the detect auxiliary light image into absolute computer coordinate location values indicative of a specific location within the computer generated image to cause the computer generated image to be changed or modified.

The modification of the projected image in the path P may be provided by a signal processor 25 and a computer 16 corresponding to the signal processor 25 and the computer 16 in copending application Ser. No. 07/656,803, the particulars of which application have been specified previously. The signal processor 25 receives signals representing the image in the charge coupled device or camera 20, processes these signals and introduces the processed signals to the computer 16. The computer 16 then determines the modifications to be provided in the projected image P on the basis of the processed signals from the signal processor and introduces the modifications to the liquid panel assembly 44.

Considering now the construction of the optical input device 10 in greater detail with reference to FIGS. 1 and 2, the charge coupled device 20 is mounted on a printed circuit board 30 which is adapted to be mounted pluggably or removably via a connector 32. The connector 32, in turn, is mounted in a stationary position on the floor or base 34 of the projector housing 14.

In order to enable the charge coupled device 20 to capture the image reflecting from the mirror 26, the housing 14 includes a window 15 which is disposed at the top of the housing 14 and oriented below the projection mirror 19 and the reception mirror 26.

As best seen in FIG. 1, the projection mirror 19 and the reception mirror 26 are both mounted on the adjustable mirror housing 40. The movable mirror housing 40 is movable between a closed position for transportation purposes and an open position for projection purposes.

When the mirror housing 40 is positioned by the user in its open position, the housing 40 causes the mirrors 19 and 26 to be angularly displaced relative to the horizontal plane of the projector window 15 by an angle of about $\theta$ degrees. The angle $\theta$ is between about 80° and about 10°. A more preferred angle $\theta$ is between about 60° and about 30°. The most preferred angle $\theta$ is about 45°. From the foregoing it should be understood, that the mirror assembly 40 is adjustable to any position within the above mentioned range of between about 80° and about 10° and will remain stationary in any adjusted position until moved by the user.

While particular embodiments of the present invention have been disclosed, it is to be understood that various different modifications are possible and are contemplated within the true spirit and scope of the appended claims. For example, it is contemplated that there is no intention, therefore, of limitations to the exact abstract or disclosure herein presented.

What is claimed is:

1. An image display projector for displaying an enlarged image on a remote viewing surface in response to image generating equipment, comprising:

a housing having a top wall;

means defining a window in said top wall;

mirror means disposed on the outside of said housing opposite said window;

image projecting means disposed on the inside of said housing and responsive to image generating equipment for projecting an image along a substantially upright optical projection path through said window to reflect from said mirror forwardly along a generally horizontal path toward the viewing surface;

optical input means including optical sensing means disposed inside said housing positioned facing said window for receiving a reflected image of the viewing surface from said mirror means downwardly along a substantially upright optical sensing path, said projection path and said sensing path being substantially parallel to one another;

said optical input means having circuit means responsive to said sensing means for controlling said image generating equipment to cause it to modify the projected image; and mounting means for positioning said mirror means adjustably relative to said window to enable the image to be adjusted positionally on the viewing surface and to maintain said sensing means in proper alignment therewith, whereby said mirror means can be moved adjustably for directing the projected image forwardly to a desired location on the viewing surface without the necessity of moving said sensing means to maintain proper alignment thereof with the projected image on the surface.

2. A projector according to claim 1, wherein said mirror means includes receptor mirror means aligned with said optical sensing means, and further includes projection mirror means aligned with said image projecting means for reflecting said image to be projected onto the remote viewing surface.

3. A projector according to claim 2, wherein said projection mirror means is movable to a position within the upright optical projection path.

4. A projector according to claim 2, wherein said receptor mirror means is movable to a position within said upright optical sensing path.

5. A projector according to claim 1, wherein said sensing means includes a charge coupled camera.

6. A projector according to claim 1, wherein said circuit means includes a mounting means, said mounting means including a printed circuit board.

7. A method of displaying an enlarged image on a remote viewing surface in response to image generating equipment, comprising:

projecting an image along a substantially upright optical path to reflect from mirror means forwardly along a generally horizontal path toward the viewing surface;

receiving a reflected image of the viewing surface from said mirror means downwardly along a substantially upright optical sensing path, said projection path and said sensing path being substantially parallel to one another;

positioning said mirror means adjustably relative to said optical paths to enable the image to be adjusted positionally on the viewing surface and to maintain a sensing means for the receiving of the reflected image along the sensing path in proper alignment therewith; and controlling image generating equipment to cause it to modify the projected image.

8. In an image display projector for displaying an enlarged image on a remote viewing surface in a response to image generating equipment, said projector having a housing having a top wall, said projector including:

means defining a window in said top wall;

mirror means disposed on the outside of said housing opposite said window;

image projecting means disposed on the inside of said housing and responsive to image generating equipment for projecting an image a substantially along upright optical projection path through said window to reflect from said mirror forwardly along a generally horizontal path toward the viewing surface;

optical input means including optical sensing means disposed inside said housing positioned facing said window for receiving a reflected image of the viewing surface from said mirror means downwardly along a substantially upright optical sensing path, said projection path and said sensing path being substantially parallel to one another;

said optical input means having circuit means responsive to said sensing means for controlling said image generating equipment to cause it to modify the projected image; and mounting means for positioning said mirror means adjustably relative to said window to enable the image to be adjusted positioning on the viewing surface and to maintain said sensing means in proper alignment therewith, whereby said mirror means can be moved adjustably for directing the projected image forwardly to a desired location on the viewing surface without the necessity of moving said sensing means to maintain proper alignment thereof with the projected image on the surface.

9. An optical input device for use with a projector for displaying an enlarged image on a remote viewing surface in response to image generating equipment, a housing having a top wall;

means defining a window in said top wall;

mirror means disposed on the outside of said housing opposite said window;

image projecting means disposed on the inside of said housing and responsive to image generating equipment for projecting an image along upright optical path through said window to reflect from said mirror forwardly along a generally horizontal path toward the viewing surface;

optical input means including optical sensing means disposed inside said housing positioned facing said window for receiving a reflected image of the viewing surface from said mirror means downwardly along a substantially upright optical sensing path, said projection path and said sensing path being substantially parallel to one another;

said optical input means having circuit means responsive to said sensing means for controlling said image generating equipment to cause it to modify the projected image; and mounting means for positioning said mirror means adjustably relative to said window to enable the image to be adjusted positioning on the viewing surface and to maintain said sensing means in proper alignment therewith, whereby said mirror means can be moved adjustably for directing the projected image forwardly to a desired location on the viewing surface without the necessity of moving said sensing means to maintain proper alignment thereof with the projected image on the surface.

10. In combination for use with a screen for displaying an image on the screen, a housing, first means disposed in the housing for producing an optical image, second means having first and second operative relationships and forming part of the housing in the first operative relationship and operative in the second relationship to become displaced from the housing and to direct the image toward the screen for display on the screen, third means disposed in the housing for receiving the image upon reflection of the image from the screen, and fourth means for directing an optical control signal to the screen, the second means being operative in the second relationship to direct to the third means the image and the optical control signal reflected from the screen.

11. In a combination as set forth in claim 10, fifth means disposed in the housing optically between the first means and the second means for directing the image from the first means to the second means for direction by the second means to the screen in the second operative relationship of the second means and disposed optically between the second means and the third means for directing to the third means the image and the optical control signal reflected to the second means from the screen.

12. In a combination as set forth in claim 10, the second means including a pair of mirrors movable in a co-ordinated relationship between the first and second positions, the first mirror being disposed in the second operative relationship to direct the image to the screen and to direct the reflected image to the third means and the second mirror being disposed in the second operative relationship to direct the reflected optical image signal to the third means.

13. In a combination as set forth in claim 12, fifth means for modifying the image on the screen in accordance with the position of the optical control signal on the screen.

14. In a combination as set forth in claim 11 wherein the second means includes mirror means pivotable between the first operative relationship and the second operative relationship and wherein the second means is pivotably adjustable in the second operative relationship through a range of position values.

15. In a combination as set forth in claim 14, sixth means for modifying the image on the screen in accordance with the disposition of the optical control signal on the screen.

16. In a combination as set forth in claim 13 wherein the second means includes at least one mirror pivotable between the first operative relationship and the second operative relationship and wherein the second means is pivotably adjustable in the second operative relationship through a range of position values.

17. In a combination as set forth in claim 15 wherein the second means includes first and second mirrors the first of which directs the image to the screen in the second operative relationship of the second means and directs the reflected image from the screen to the third means and the second of which directs the reflected optical control signal to the third means and wherein the first and second mirrors are synchronously pivotable between the first operative relationship and the second operative relationship and the first and second mirrors are pivotally adjustable in the second operative relationship through a range of position values.

18. In combination for use with a reflective screen for displaying an image on the screen, first means for providing an image for display on the screen, second means having optical properties for projecting the image through a particular optical path, third means for projecting an optical control signal on the screen, fourth means for receiving the image and the optical control signal and for providing a reproduction of the image and the optical control signal, fifth means including the second means for directing the image in the particular optical path from the second means to the screen and for directing the reflection of the image and the optical control signal in the particular optical path through the second means to the fourth means;

sixth means for modifying the image on the screen in accordance with the position of the optical control signal on the screen; and the first means, the second means and the fourth means are disposed within a common housing and the fifth means has first and second positions and is disposed in the first position within the housing and is movable to the second position to direct the image in the particular optical path from the second means to the screen and to direct the reflected image and the reflected control image signal in the particular optical path through the second means to the fifth means.

19. In combination for use with a reflective screen for displaying an image on the screen, first means for providing an image for display on the screen, second means having optical properties for projecting the image through a particular optical path, third means for projecting an optical control signal on the screen, fourth means for receiving the image and the optical control signal and for providing a reproduction of the image and the optical control signal, fifth means including the second means for directing the image in the particular optical path from the second means to the screen and for directing the reflection of the image and the optical control signal in the particular optical path through the second means to the fourth means;

sixth means for modifying the image on the screen in accordance with the position of the optical control signal on the screen;

the fifth means including mirror means adjustably positioned relative to the second means and the screen to direct the image from the first means through the second means in the particular optical path to the screen and to direct the reflected image and the reflected optical image signal through the second means in the particular optical path to the fourth means;

a housing for the first means, the second means and the fourth means, and the mirror means being adjustable between first and second positions and forming a part of the housing in the first position and being disposed in the second position to direct the image from the first means in the particular optical path through the second means to the screen and to direct the reflected image and the reflected control image signal in the particular optical path through the second means to the fourth means.

20. In combination for use with a reflective screen for displaying an image on the screen, first means for providing an image for display on the screen, second means having optical properties for projecting the image through a particular optical path, third means for projecting an optical control signal on the screen, fourth means for receiving the image and the optical control signal and for providing a reproduction of the image and the optical control signal, fifth means including the second means for directing the image in the particular optical path from the second means to the screen and for directing the reflection of the image and the optical control signal in the particular optical path through the second means to the fourth means;

sixth means for modifying the image on the screen in accordance with the position of the optical control signal on the screen;

the fifth means including mirror means adjustably positioned relative to the second means and the screen to direct the image from the first means in the particular optical path through the second means to the screen and to direct the reflected image and the reflected control image signal in the particular optical path through the second means to the fourth means, a housing for the first means, the second means and the fourth means, and the mirror means being adjustable between first and second positions and forming a part of the housing in the first position and being disposed in the second position to direct the image from the first means in the particular optical path through the second means to the screen and to direct the reflected image and the reflected control image signal in the particular optical path through the second means to the fourth means.

21. In combination for use with a reflective screen for displaying an image on the screen, a housing, first means disposed in the housing for producing the image, second means disposed in the housing for optically directing the image toward the screen, third means disposed in the housing for receiving the image upon reflection of the image from the screen, the second means being disposed to direct the reflected image optically to the third means, means for directing an optical control signal to the screen for reflection by the second means optically to the third means, fourth means for modifying the image on the screen in accordance with the control image signal on the screen, and fifth means adjustable between first and second positions and defining a part of the housing in the first position and displaced from the housing in the second position and normally disposed in the first position and movable to the second position and co-operative with the second means in the second position for optically directing the image to the screen and for directing the reflected image optically to the third means and for reflecting the control image signal optically to the third means.

22. In a combination as set forth in claim 21, the fifth means including a pair of mirrors pivotable on a co-ordinated basis between the first and second positions, the first mirror being disposed in co-operative relationship with the second means for optically directing the image to the screen in the second position of the fifth means and for optically directing the reflected image to the third means in the second position of the fifth means and the second mirror being disposed in the second position to direct the reflected control image signal to the third means.

23. In a combination as set forth in claim 21, the first means including a light source and a liquid crystal panel assembly and at least one image projecting mirror and the second means including a projection lens assembly.

24. In a combination as set forth in claim 21, the fifth means being liftable from the housing and pivotable relative to the housing to assume the second position and the second position being adjustable.

* * * * *